Patented Feb. 25, 1936

2,032,165

UNITED STATES PATENT OFFICE 2,032,165

METHOD OF EXTRACTING CAROTENE

Harold M. Barnett, Cleveland, William O. Frohring, Shaker Heights, and Albert F. O. Germann, Cleveland, Ohio, assignors to S. M. A. Corporation, Cleveland, Ohio, a corporation of Ohio No Drawing. Application November 11, 1932, Serial No. 642,272

8 Claims. (Cl. 99—22)

This invention relates to a concentrated solution of carotene in oils or fats and to the method of making the same. Its object is to provide a supersaturated solution of this kind which may be prepared by a relatively simple method and which supplies a solution containing carotene in quantities greater than the normal saturation amount, but in which the carotene is stable against separation at normal temperatures, with no liability of crystallization, and which method involves no liability of loss of carotene by polymerization or other changes.

The solubility of carotene in oils or fats, for example, cottonseed or similar oils, or solid fats, such as butter, cocoabutter, or compound fats, such as oleomargarine, is relatively low, of the order of 0.1%. Attempts to produce higher concentrations have been unsatisfactory for several reasons. In the first place, the inclusion of a greater quantity of carotene, more than the saturation quantity, results in spontaneous deposition by crystallization upon standing for a short time. Secondly, excess carotene is usually attempted to be included in oils by warming a suspension of carotene crystals in oil, with consequent loss of carotene due to its tendency to become decolorized at elevated temperatures, as a result of chemical change, the nature of which is not well understood. We shall refer to it as a polymerization, although it may be an oxidation, or perhaps a decomposition.

According to my invention, we produce a solution of carotene in oil by a method which avoids polymerization and which nevertheless produces a solution containing carotene in quantities greater than the normal saturation amount, by taking advantage of and utilizing the fatty material existing alongside of the carotene in the source from which it originally comes, to wit, plant materials or the like. Plant materials, such as carrots, spinach and the like, contain carotene, probably dissolved in the fat of the plant. True, the amount of this fat is very small, and in the case of carrots experience shows that it may be less than 0.1% of the weight of the fresh carrot. According to Circular No. 146, "Approximate Composition of Fresh Vegetables", by Chatfield and Adams, issued by the U. S. Department of Agriculture in January, 1931, the average fat content of fresh carrots is 0.3%. Extraction of the dried and finely powdered carrots or other plants materials by suitable solvents, particularly volatile solvents, such as benzine, extracts not only the carotene but also the fatty content just referred to. When the volatile solvent, such as benzine, is removed from the extracted fat by vaporization, more than half, and even as much as three-fourths, of the carotene separates in the form of deposited crystals, which may be removed from the reidual fatty content in any suitable manner. The proportion of carotene which separates depends to some extent, of course, upon the total quantity present.

According to our invention, we extract the carrots or other plant material with a suitable volatile solvent, such as benzine, in the manner described, but the vaporization for removal of the volatile solvent is not carried out completely or even nearly so. In fact, the volatile solvent is vaporized to a point where the fatty plant material, or plant lipoids, may form in the neighborhood of, say, 5% to even 20% of the total volume of residual liquor. These amounts of 5% and 20% are not stated as limiting values because under certain special conditions even more than 20% or even less than 5% may be present. What actually happens, of course, depends to some extent upon the relative proportions and the absolute amounts of fatty material and carotene present in the raw material. Depending upon the total amount of carotene present, and particularly upon whether it is in excess, some of the carotene, even as much as one half or even more thereof, may separate or be deposited at this point in the form of crystals, which may be removed in the usual manner, such as in a centrifuge or by filtration, and may be used in any manner as carotene after any purification steps or the like. This provides a simple method by which excess carotene is taken care of and removed in such manner as to leave in the residual liquor the proper amount of carotene for satisfactory use in the subsequent steps of the method.

The remaining mother liquor, freed of the carotene crystals described, is then evaporated to remove benzine, leaving as a residue the plant lipoids containing the remaining carotene, approximately one-half the original total amount, but this carotene is found not to separate so long as the lipoid or fatty residue is not permitted to cool. The residue is maintained at a temperature of about 60° to 70° C. while the last traces of the volatile solvent are removed in any suitable manner. For example, the residue may be maintained at the aforesaid temperature for several hours in a vacuum, or even in an atmosphere of a suitable inert gas which is passed over the residue or bubbled through it, such as an atmosphere of oxygen-free nitrogen, carbon dioxide, or hydrogen. Passing a current of such gas through the hot fatty residue removes the last traces of volatile solvent.

Without previous cooling, the carotene-rich lipoid residue is now rapidly diluted with a suitable base material, such as oil or fat which it is desired to enrich with carotene. Such oil or fat may, for example, be peanut oil, cottonseed oil, soy bean oil, cocoanut oil, olive oil, palm oil; the more solid oils or fats, such as cocoa butter; compound fats, such as oleomargarine; and animal fats, such as butter, lard or the like. The more solid fats may be enriched by liquefying the same by warming and then adding a proper amount of the carotene-rich lipoid residue, or, if preferred, such carotene-rich lipoid residue may be incorporated with a more or less solid fat by kneading The resulting fat or fat mixture, containing carotene together with the original plant lipoids, is found to be entirely stable when it contains as much as 0.3% of carotene, or even more, determined colorimetrically, and does not deposit carotene crystals at ordinary temperatures, even though seeded with crystals of carotene. It has also been found that the mixture is stable against oxidation.

In some cases it is desirable to cool the carotene-rich lipoid residue and to store the same over an extended period of time. Cooling, of course, permits or causes the carotene to separate in the form of crystals, which are practically impossible of direct solution in the fat or oil. Accordingly, when the carotene-rich lipoid residue is cooled, intentionally or for any reason, so that carotene crystals separate, it is nevertheless useable as follows:—

The lipoid residue containing crystallized carotene is diluted with 15 to 20 volumes of a suitable volatile solvent, such as benzine, and the resulting solution is warmed in a suitable still to remove the added benzine, which may be accomplished, if desired, in a vacuum or in the presence of an inert gas, as before described. During the distillation of the volatile solvent the crystallized carotene is redissolved, so that the residual substance is again a solution of carotene in the plant lipoid and suitable for dilution with any suitable oil or fat, as before.

The term "lipoid" is used herein in its common sense of including not only fats and fatty materials, but also certain other materials, not necessarily fats, but which are extracted from dried plant materials with the fats by the ordinary fat solvents.

What we claim is:

1. A method of producing a fat product rich in carotene, which comprises extracting from plant material both carotene and plant lipoids with a solvent for both, removing a portion of the solvent to cause crystallization in the remaining portion of a part of the carotene, removing the crystallized carotene, removing the remaining solvent to leave as a residue a mixture of carotene and sufficient plant lipoids to maintain the carotene in solution, and mixing such residue with a sufficient amount of fatty base material to produce a solution which is substantially stable against carotene separation at ordinary temperatures.

2. A method of producing a fat product rich in carotene, which comprises extracting from plant material both carotene and plant lipoids with a solvent for both, removing a portion of the solvent to cause crystallization in the remaining portion of a part of the carotene, removing the crystallized carotene, removing the remaining solvent to leave as a residue a mixture of carotene and a sufficient amount of plant lipoids to maintain the carotene in solution, and mixing such residue with a fatty base material in quantity sufficient to adjust the carotene content to approximately 0.3%, thereby producing a carotene solution which is supersaturated but nevertheless substantially stable against carotene separation at ordinary temperatures.

3. A method of producing a fat product rich in carotene, which comprises extracting from plant material both carotene and plant lipoids with a solvent for both, removing a portion of the solvent to cause crystallization in the remaining portion of a part of the carotene, removing the crystallized carotene to leave as a residue the remaining solvent and sufficient plant lipoids to maintain the remaining carotene in solution at an elevated temperature, removing the remaining solvent while maintaining the residual mixture of carotene and plant lipoids at an elevated temperature, and mixing such residual mixture without cooling with a fatty base material in a quantity sufficient to adjust the carotene content to approximately 0.3%, thereby producing a carotene solution which is supersaturated but nevertheless substantially stable against carotene separation.

4. A method of producing a fat product rich in carotene, which comprises extracting from plant material both carotene and plant lipoids with a volatile solvent for both, distilling the volatile solvent until the plant lipoids form approximately 5% to 10% of the total volume, thereby causing a part of the carotene to deposit as crystals, removing the crystallized carotene to leave as a residue the remaining solvent and sufficient plant lipoids to maintain the remaining carotene in solution, removing the remaining volatile solvent from the residue, and diluting the residue with a sufficient amount of oily base material to produce a solution which is substantially stable against carotene separation at ordinary temperatures.

5. A method of producing an animal fat product rich in carotene, which comprises extracting from plant material both carotene and plant lipoids with a solvent for both, evaporating the solvent to leave as a residue a mixture of carotene and sufficient plant lipoids to maintain the carotene in solution, mixing such residue with a fatty base material and separating the solution so formed from undissolved matter to form a solution of carotene in the fat which is stable at ordinary temperatures.

6. The method of producing a vegetable oil rich in carotene which comprises adding the carotene to the vegetable oil in the form of a lipoid solution in which a sufficient amount of the lipoids are present to maintain the carotene in solution and to provide an oil which is stable against carotene separation at ordinary temperatures.

7. The method of producing an animal fat rich in carotene which comprises adding the carotene to the fat in the form of a lipoid solution in which a sufficient amount of the lipoids are present to maintain the carotene in solution and to provide a fat which is stable against carotene separation at ordinary temperatures.

8. The method of producing a fat product rich in carotene which comprises extracting from plant material both carotene and plant lipoids with a solvent for both, removing a portion of the solvent to cause crystallization in the remaining portion of a part of the carotene, removing the crystallized carotene to leave as a residue the remaining solvent and sufficient plant lipoids to maintain the remaining carotene in solution at an elevated temperature, removing the remaining solvent while maintaining the residual mixture of carotene and plant lipoids at an elevated temperature a sufficient amount of plant lipoids being present to maintain the carotene in solution, and mixing the residue without cooling with a sufficient amount of a fatty base material to produce a solution which is substantially stable against carotene separation at ordinary temperatures.

HAROLD M. BARNETT.
WILLIAM O. FROHRING.
ALBERT F. O. GERMANN.